May 5, 1925.
P. KREUZHAGE
1,536,505
APPLIANCE FOR REPLACING DERAILED RAILROAD VEHICLES
Filed Nov. 8, 1924
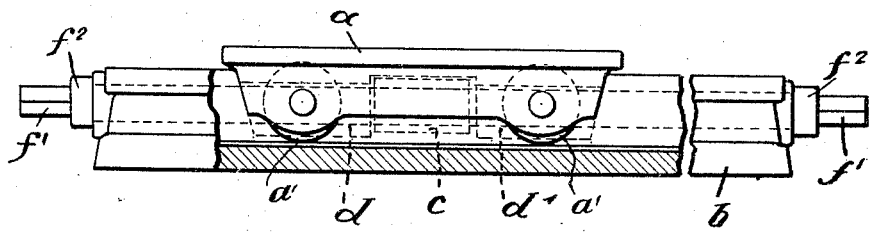
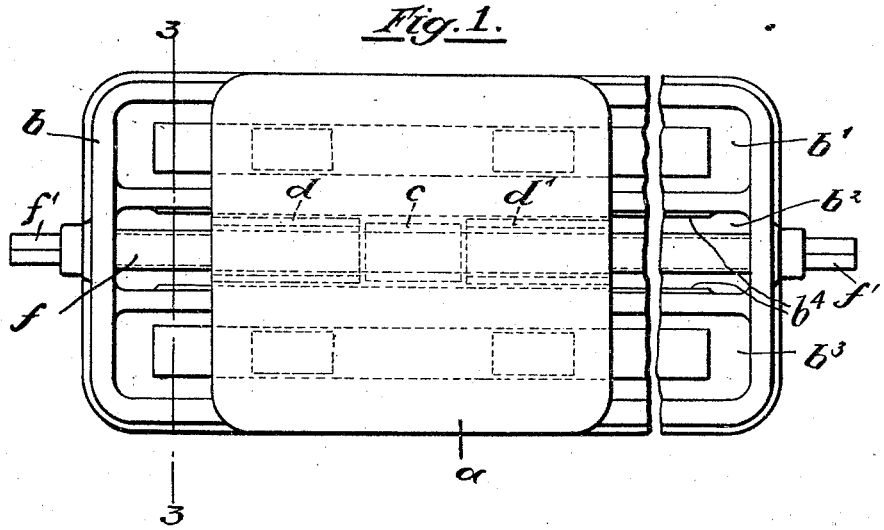
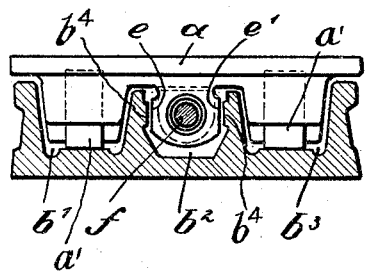
Inventor:
Paul Kreuzhage
by
Attorney.

Patented May 5, 1925.

1,536,505

UNITED STATES PATENT OFFICE.

PAUL KREUZHAGE, OF CANNSTATT, GERMANY.

APPLIANCE FOR REPLACING DERAILED RAILROAD VEHICLES.

Application filed November 8, 1924. Serial No. 748,669.

*To all whom it may concern:*

Be it known that I, PAUL KREUZHAGE, a citizen of Germany, residing at Cannstatt, Germany, have invented certain new and useful Improvements in Appliances for Replacing Derailed Railroad Vehicles, of which the following is a specification.

My invention relates to appliances for replacing on the track derailed railroad vehicles. The appliance may also be used for shunting, serving as an auxiliary travelling platform.

The novel appliance has for its object to displace the vehicles, which may be cars or locomotives, laterally for the purpose of placing them on a track. To this end I provide a base plate on which a table or carriage can travel a short distance. A suitable lifting device is secured to the travelling carriage by means of which the vehicle is raised so that the flanges of the wheels are above the rail. When the vehicle has been so raised, the carriage with the vehicle it supports is displaced laterally by suitable means, for instance by means of a screw, until the wheels are in the desired position above the rails whereupon the vehicle is lowered down on the rails.

In the drawings affixed to this specification and forming part thereof a device embodying my invention is illustrated diagrammatically by way of example.

In the drawings—

Fig. 1 is a plan view.

Fig. 2 is an elevation, partly in section.

Fig. 3 is a cross section on line 3—3 of Fig. 1.

Referring to the drawings $a$ is the table or carriage which is here designed as a traverse truck comprising four wheels $a^1$ running on tracks $g$ of the base plate $b$. A screw spindle $f$ provided with square ends $f^1$ and collars $f^2$ and rotatably carried in the base plate $b$ serves for displacing the truck $a$ by means of a nut $c$.

The cross section of the base plate comprises three grooves $b^1$, $b^2$ and $b^3$. The two lateral grooves $b^1$ and $b^3$ are formed with the tracks $g$ and the central groove $b^2$ is provided with guide faces $b^4$ for lugs $d$, $d^1$ of the truck $a$. The screw spindle $f$ is arranged in the central groove $b^2$. The nut $c$ of the spindle is arranged between two lugs $d$ and $d^1$ secured to the truck $a$. The inner ends of the lugs $d$, $d^1$ are distanced apart more than the length of the nut $c$ so that some play is provided for between said nut and said lugs. This permits the nut $c$ to adapt itself to the screw $f$ without exerting pressure thereon, as might happen if the base plate $b$ were deformed due to irregularities of the track, or from other reasons.

The lugs $d$ and $d^1$ are partly provided with faces $e$, $e^1$ adapted to cooperate with the faces $b^4$ of the groove $b^2$ so as to guide the truck $a$ in parallel to the central line of the screw spindle $f$. Similar faces are preferably formed on the nut $c$ in order to prevent it from rotating with the screw spindle. The lugs surround the screw spindle $f$ and prevent the trolley $a$ from leaving the base plate when being handled or shipped.

The lifting appliance of the truck $a$ may be of any suitable construction and is therefore not shown and described. It will be understood that any number of tracks may be provided in the base plate $b$ and that the truck $a$ may have any number of wheels.

I also wish it to be understood in general that I do not desire to be limited to the exact details of construction shown and described, for obvious modifications will occur to a person skilled in the art.

I claim:

1. Device for replacing on the track derailed railroad vehicles comprising a base plate, a truck guided longitudinally on said plate, a screw spindle extending longitudinally on and mounted in said plate for rotation, a nut secured against rotation on said spindle and lugs projecting from said truck and embracing said nut.

2. Device for replacing on the track derailed railroad vehicles comprising a base plate with longitudinal grooves, a truck guided in said grooves, a screw spindle extending longitudinally on and mounted in said plate for rotation, a nut secured against rotation on said spindle and lugs projecting from said truck and embracing said nut.

3. Device for replacing on the track derailed railroad vehicles comprising a base plate with longitudinal grooves, a truck guided in said grooves, a screw spindle extending in one of said grooves, a nut on said spindle fitting in said groove and lugs projecting from said truck into said groove in front and to the rear of and in operative contact with said nut.

In testimony whereof I affix my signature.

PAUL KREUZHAGE.